United States Patent [19]
Patterson et al.

[11] Patent Number: 5,448,881
[45] Date of Patent: Sep. 12, 1995

[54] GAS TURBINE ENGINE CONTROL BASED ON INLET PRESSURE DISTORTION

[75] Inventors: Gregory S. Patterson, Stuart; George W. Gallops, Jr., Lake Worth, both of Fla.

[73] Assignee: United Technologies Corporation, Hartford, Conn.

[21] Appl. No.: 74,431

[22] Filed: Jun. 9, 1993

[51] Int. Cl.[6] .............................................. F02C 9/16
[52] U.S. Cl. .................................. 60/39.29; 60/242; 364/431.02; 415/26
[58] Field of Search ................... 60/39.24, 39.29, 235, 60/236, 242; 364/431.02; 415/26, 27, 28

[56] References Cited

U.S. PATENT DOCUMENTS

| | | | |
|---|---|---|---|
| 3,911,260 | 10/1975 | Dustin | 60/39.29 |
| 4,130,872 | 12/1978 | Harloff | 364/431.02 |
| 4,414,807 | 11/1983 | Kerr | 60/236 |
| 4,550,564 | 11/1985 | Callahan et al. | 60/39.29 |
| 4,581,888 | 4/1986 | Schmitzer et al. | 60/39.29 |

Primary Examiner—Louis J. Casaregola
Attorney, Agent, or Firm—Robert E. Greenstien

[57] ABSTRACT

Circumferential and radial inlet pressure distortion on an aircraft gas turbine engine are detected by a plurality of static pressure sensors and a signal processor, which computes the total pressure for each sensor to determine a pressure distortion pattern which the processor correlates with stored data for the engine and inlet to determine if the airflow geometry should be altered during flight. Time varying changes in the pressure from one or more of the pressure sensors is used to determine a stall condition, causing a change in engine airflow geometry to increase stall margin.

7 Claims, 4 Drawing Sheets

GAS TURBINE ENGINE CONTROL BASED ON INLET PRESSURE DISTORTION

DESCRIPTION

1. Technical Field

This invention relates to gas turbine engines, in particular, gas turbine engine control based on inlet pressure distortion.

2. Background of the Invention

Future aircraft gas turbine engines must have the capability to successfully accommodate the increased steady-state and dynamic inlet pressure distortion that is encountered on high speed aircraft operating at supersonic speeds, and on aircraft with high maneuverability thrust vectoring. These distortion effects directly impact compressor stall margin, and future engine systems, which will be designed with less stall margin to reduce compression system weight. Reduced design stall margin is made practical by the newer adaptive engine control systems that are capable of maintaining adequate stall stability by adjusting the steady state and transient compression system component match points to instantaneous engine operating conditions. Inlet pressure distortion and inlet recovery are but factors—although very important—in establishing the instantaneous stability requirements. In a contemporary adaptive control system, these factors are not measured but are represented by non-adaptive model algorithms. The margins that are required to account for high pressure distortion operation reduces the potential benefit of the adaptive control concept during normal engine operation.

The relationship between compressor stall and inlet conditions is known. U.S. Pat. No. 5,165,844, for instance, also assigned to the assignee of this application, discusses some techniques to control compressor "stall margin", and may be reconsidered representative of the state of the art dynamic, real-time techniques that control engine geometry with active components such as stators and variable exhaust nozzles.

Variations in pressure across and around the compressor inlet duct (radial and circumferential pressure variations) can be so uneven at times as to put substantial portions of the compressor in operating conditions at or below proper stall pressure ratios. U.S. Pat. No. 4,872,807, also assigned to the assignee of this application, considers a technique that measures inlet pressure at the compressor axis, but not inlet pressure distortion, as part of a scheme to control "engine geometry" with a control, to regulate stall margin levels. The patent describes a computation process, partially harnessed in this invention, by which the static pressure yields a dynamic pressure component based on the instantaneous engine operating conditions, namely N1, N2, T2 and PT2. That process only measures the pressure at one point-only at the engine center line axis at that.

To some degree, what is shown in U.S. Pat. No. 4,872,807 typifies conventional approaches premised on employing predetermined correlations of distortion intensity as a function of aircraft altitude and flight condition, engine airflow an inlet ramp position (on variable inlet equipped aircraft). In other words, they are premised on estimations of pressure distortion that can be encountered but are not premised on the actual pressure distortion.

Conventional jet engine knowledge recognizes that there usually are variations in pressure across and around the inlet surface; in other words, an uneven pressure distribution. This can arise for many reasons, among them engine orientation and ambient airflow during different aircraft flight modes and ambient airflow conditions. Depending upon the magnitude of variation in pressure from an average pressure and the location of these variations radially and circumferentially, an engine will experience variations in stall margin. Conventional measurements of these pressures during tests have used total pressure sensors located at different (up to forty) locations in the inlet.

But for actual aircraft applications, total pressure sensors are not practical for reasons of safety and reliability. Extending into the airflow path, much like a pitot tube used on aircraft to measure airspeed, a total pressure sensor is an obstruction directly in front the compressor blades, not only affecting airflow to some extent, but, creating a dangerous projectile that can break off if struck by debris, producing catastrophic engine damage The approach may have some appeal for experimental purposes but is unacceptable for actual aircraft applications for those safety reasons.

Several methods for computing total pressure measurements with distortion indices are in use in the gas turbine industry, but only for experimental purposes since they are premised on total pressure measurements simply to determine experimental inlet pressure variations. One standard, often used to correlate measured pressure distribution to distortion levels, is the industry standard SAE ARP 1420. Though this standard is primarily intended for research purposes, where a large number of measurements are made (typically 40), it may be applicable to a reduced number of measurements. The technique is predicated on the relationships between "total stall margin loss" and stall margin due to circumferential and radial pressure distortion. The total stall margin loss may be computed by interpolating stall margin loss from experimentally obtained circumferential and radial pressure distortions using flow obstructing devices such as screens and meshes with different areas in the inlet flow path.

DISCLOSURE OF THE INVENTION

An object of the invention is to provide a high responsive static pressure sensor array and processing system for combined use in the calculation of inlet face distortion and in the recognition of stall precursors associated with near-stall operation.

An object of the invention is to use the quantitative intensity of the distortion components (steady and time varying; circumferential and radial) with adaptive engine models in representing the effects on inlet recovery, component performance and stall line loss.

An object of the invention is to rely on system bandwidth to filter time varying disturbances into components that should be rejected by the control system and components that must be accommodated by stability margin. Recognition of stall precursors can identify near-stall operation to provide adaptive models of the basic compression system and provide instantaneous limiting for safety.

An object of the present invention is to provide an improved stall margin control in gas turbine engines by mapping total airflow into the engine based on static pressure measurements correlated to specific engine characteristics.

According to the present invention, multiple static pressure measurements are made in the inlet and converted to local instantaneous total pressures to determine the variation and thereby the total pressure distortion from which engine control is augmented to balance engine operation to the distortion pattern.

According to the invention, from the total pressure measurements, circumferential and radial distortion are computed and then used to address stored data indicating a stall margin condition for the inlet. The stall margin indication is used to address a compressor airflow geometry correction for the particular engine to produce a signal that changes airflow to achieve a desired stall margin (reduce "stall margin loss" due to the total pressure distortion).

According to the invention, time varying levels (oscillations and transients) in the total pressure as an indication (precursor) of stall initiate an immediate change in compressor airflow geometry.

According to one aspect of the invention, starting with the computed total pressure ($P_t$) for each sensor (computed from the static pressure) the average total pressure ($P_{tavg}$) for all the sensors is computed in real time by a signal processor. The average total pressure ($P_{IDavg}$) of all the inner diameter (ID) sensors (around the cone) is computed along with the average ($P_{ODavg}$) of the total pressures for all of the outer diameter (OD) sensors (along the circumference of the inlet). The distortion in the radial direction is determined from the difference between $P_{ODavg}$ and $P_{IDavg}$ divided by $P_{tavg}$. The circumferential distortion is determined from the difference between $P_t$ (total pressure computed at each point) and the $P_{tavg}$ divided by $P_{tavg}$, producing a distortion value for each OD sensor location, from which a map of overall circumferential distortion value is available. From that value, circumferential stall margin loss is determined by referencing stored data for the specific inlet. Using the stall margin loss and stored information on the engine specifically correlating the relationship between stall margin loss and actual engine airflow (pressure ratio) a signal is produced to achieve a desired pressure ratio.

Among the features of the present invention, it provides superior stall margin control that is tailored to each engine through a somewhat "universal" inlet pressure sensing philosophy; that is, the same pressure sensor arrangement can be used on different types of engines. In any case, the sensors are non-obstructing.

Another feature of the invention is that it can use opto-pressure sensors for pressure sensing and can be incorporate into "FADECS" (full authority digital engine controls). The same approach may be taken to provide a map of inlet temperature across the inlet, also using flush sensors incorporating temperature probes.

Still another feature, the invention provides instantaneous measurement and recognition of the actual inlet distortion pattern. Distortion measurement improves accuracy, reduces analytical and flight development, accommodates rapidly occurring abnormal conditions such as exhaust ingestion, aircraft wakes, ground effects and inlet failure or damage. The invention also provides actual measurement of engine face pressure for inlet recovery calculation and optimization.

Other features and benefits of the invention will be apparent to one skilled in the art from the following discussion.

BEST MODE FOR CARRYING OUT THE INVENTION

When flow path pressure is measured at sites distributed around the outer and inner walls of an engine, as in the case of this invention, it may be done with flush or slightly protruding static ports (to pressure sensors). In the preferred embodiment there are typically six to eight sited on the outer wall, equally spaced apart (angularly) and three to four on the inner wall (engine nose). The pressure measurements are converted using basic equations such as:

Static to Total Pressure Conversion

Equation 1

$$M = [(2/\gamma - 1)(1 - (P_t/P_s)^k)]^{0.5}$$

where:

$P_t$ = total pressure
$P_s$ = static pressure
M = Math number (flow)
$C_p$ = position error
k = $\gamma - 1/\gamma$ This shows that for a particular fan (compressor) the solution to the first relation can be represented as a tabular conversion function in terms of inlet corrected mass flow:

Equation 2

$$P_t/P_s = f(\text{inlet corrected mass flow})$$

With these relationships, total pressure is calculated for each measurement point (static sensor position) by multiplying the static pressure by the conversion function obtained at the site of each static pressure sensor.

Figure 1:
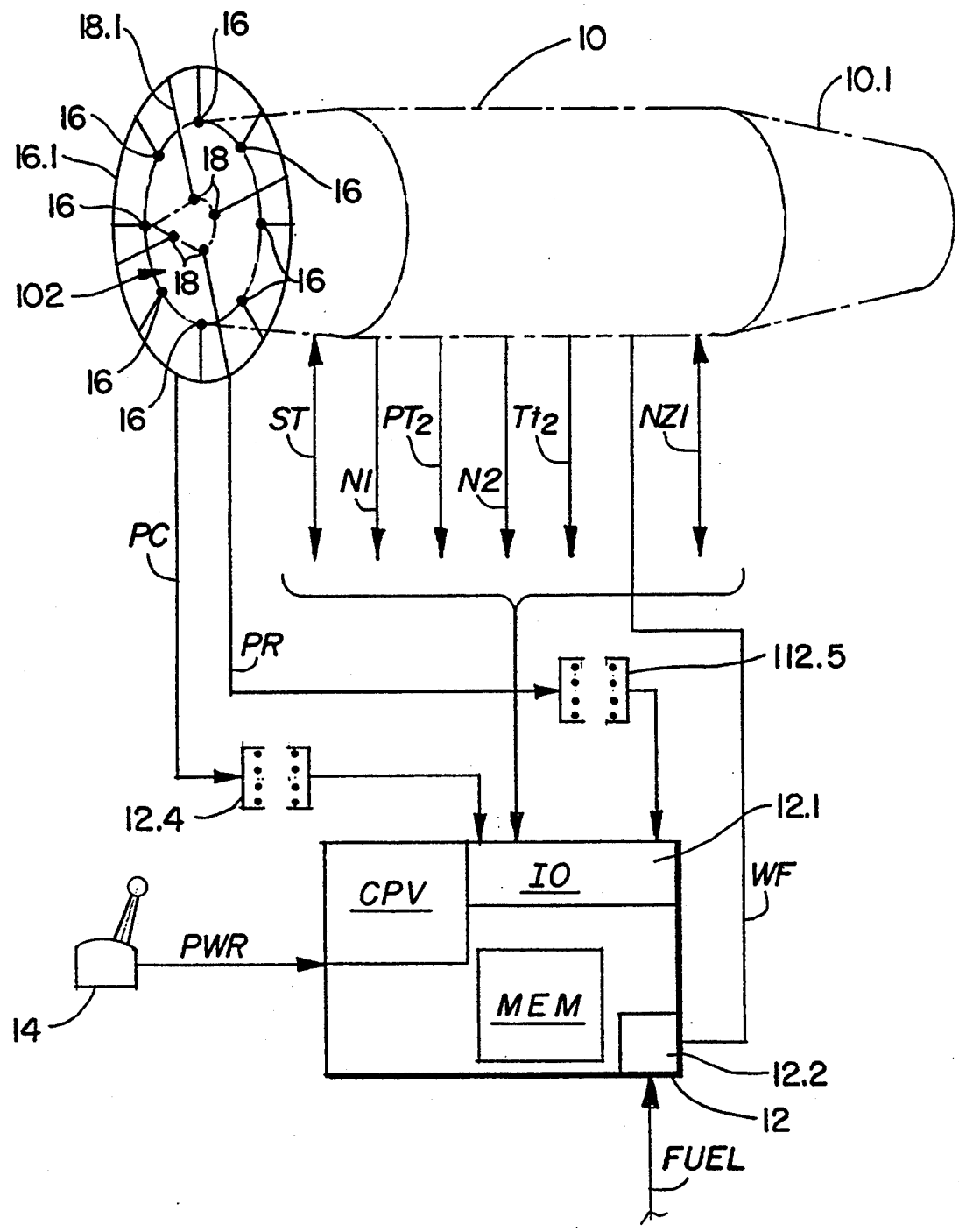
FIG. 1 is a functional block diagram showing an aircraft gas turbine and a control and signal processing system for processing static pressure signals from a plurality of static pressure sensors around the inlet and around the inlet cone in an arrangement embodying the present invention.

Referring first to FIG. 1, the internal components of a gas turbine engine 10 have not been shown. Those components are known, as shown, for example, in U.S. Pat. No. 4,414,807, which also shows engine operating signals (in common nomenclature) N1, $W_f$, $T_{T2}$, which are used in a computation made with the invention shown in FIG. 3, where the total pressure is $P_t$. The engine is assumed to have mechanisms to vary its airflow geometry, such as a variable area exhaust nozzle 10.1 and a stator control (not shown) operable by a stator control signal ST. The signal NZ1 controls the nozzle area. An electronic control 12 is connected to a power lever 14 that provides a PWR signal to the control 12, which, among other things, controls fuel flow $W_f$ to the engine. The control 12 is "computer based"; that is it has a "central processing unit" or signal processor (CPU) that is programmed to receive the indicated signals, address a memory unit MEM and control engine operation. This is an oversimplification of a so called "digital electronic engine control" because the assumption is that the fundamentals of such controls are well known in the art, in as much as those controls are in wide use. The invention resides in using such a control and special sensors (flush static pressure sensors) to give a gas turbine engine a special operating quality. The control 12 is assumed to have an input/output section 12.1 through which it interacts with the engine and its subsystems, such as the stator control or the nozzle area control. Subsystem 12.2 represents a common fuel control section of the control.

Directing attention to the front end or inlet 10.2 of the engine, the presence of eight "circumferential" static pressure sensors 16 or transducers should be observed. These are located on the inside of the inlet, preferably just in front of the fan. Each sensor provides a signal PC to the control 12 over one of the lines 12.4. Radially inward from the sensors 16, are four similar static pressure transducers 18. These are located around the nose, just before the fan. Each sensor 18 provides a signal PR of one of the lines 12.5 to the control 12. Considering the inlet a surface area, it will be noted that a sensor 18 is approximately angularly equidistant from a sensor 16.

Figure 2:
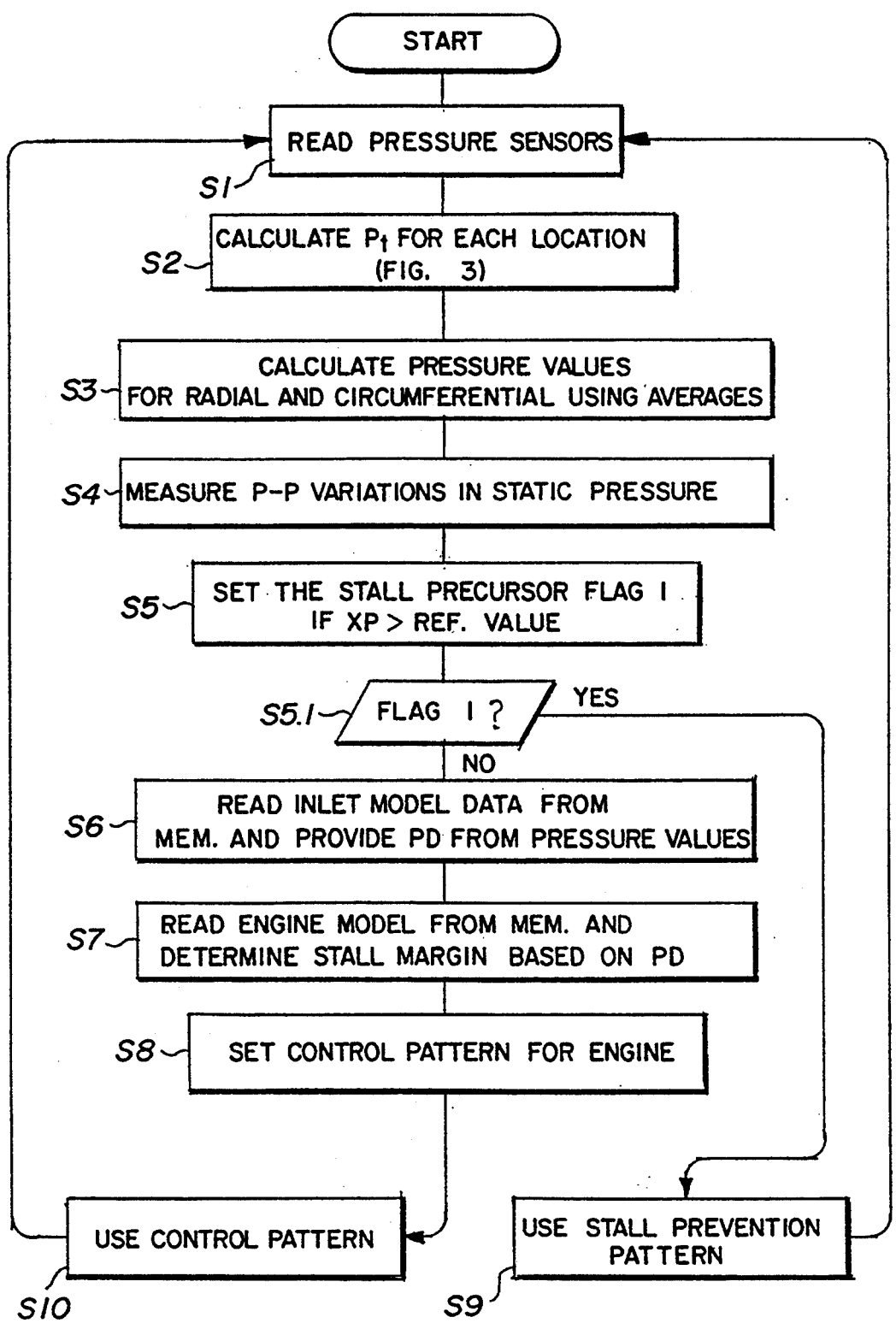
FIG. 2 is a flow chart showing signal processing steps for carrying out the present invention using the signal processor shown in the system shown in FIG. 1.
Figure 3:
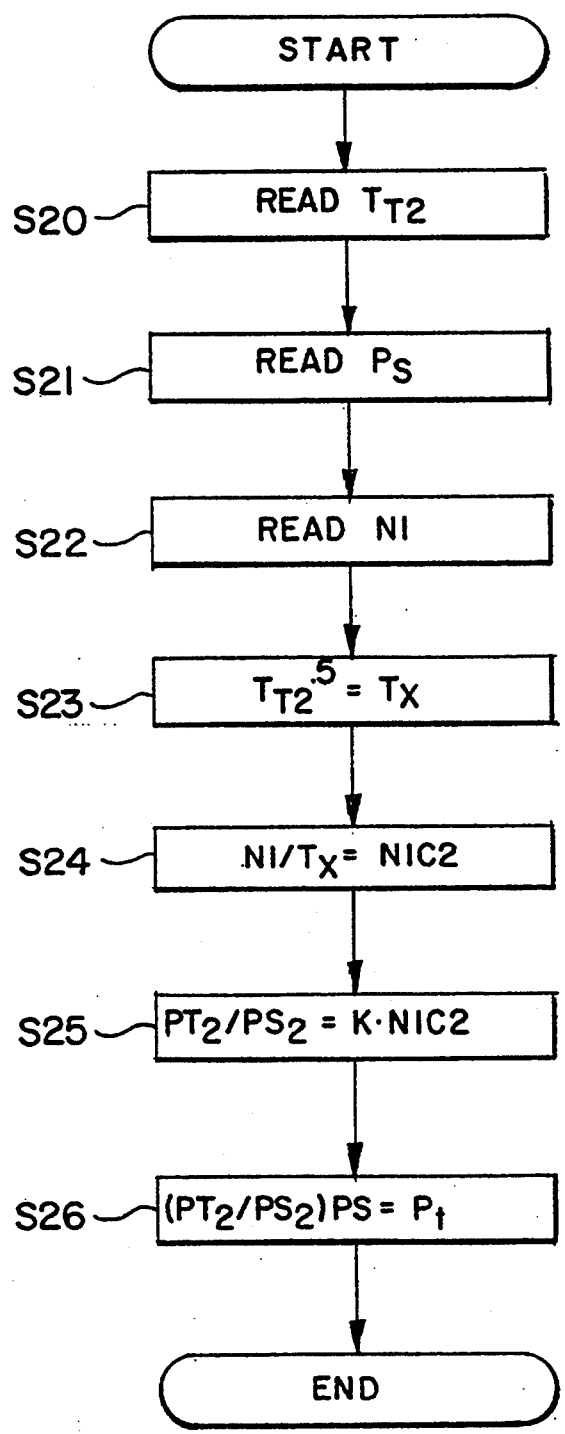
FIG. 3 is a flow chart of a subroutine for computing pressure from a static pressure sensor using $T_{T2}$, $P_S$, N1 signals from the gas turbine engine.
Figure 4:
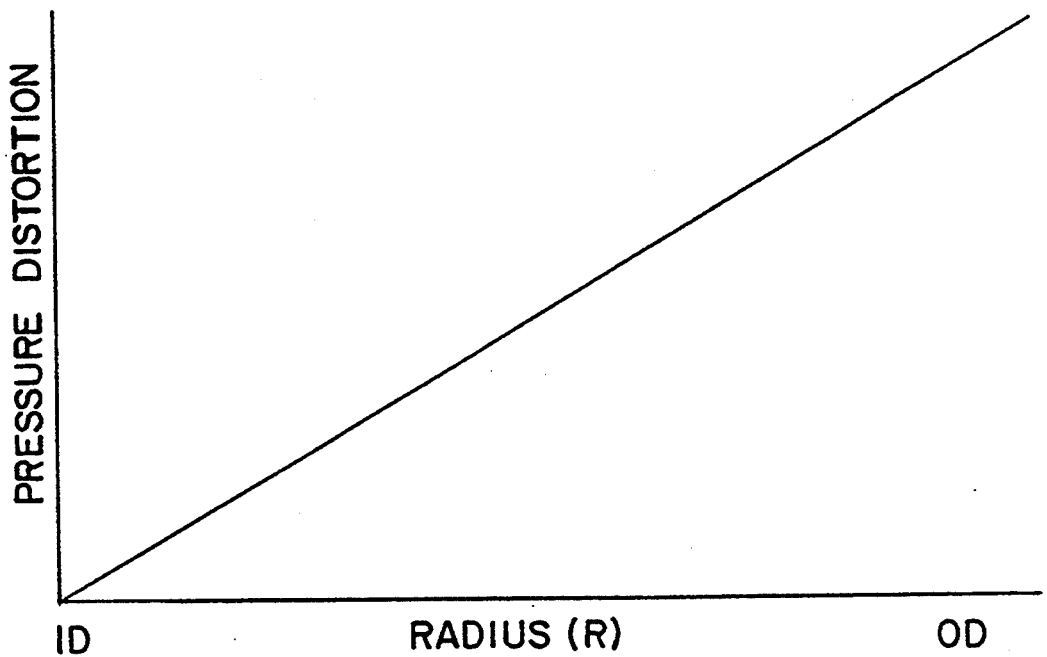
FIG. 4 is a graph showing a typical map of radial pressure distortion when there is difference between radial and circumferential static pressure measurements of the type sensed according to the present invention.
Figure 5:
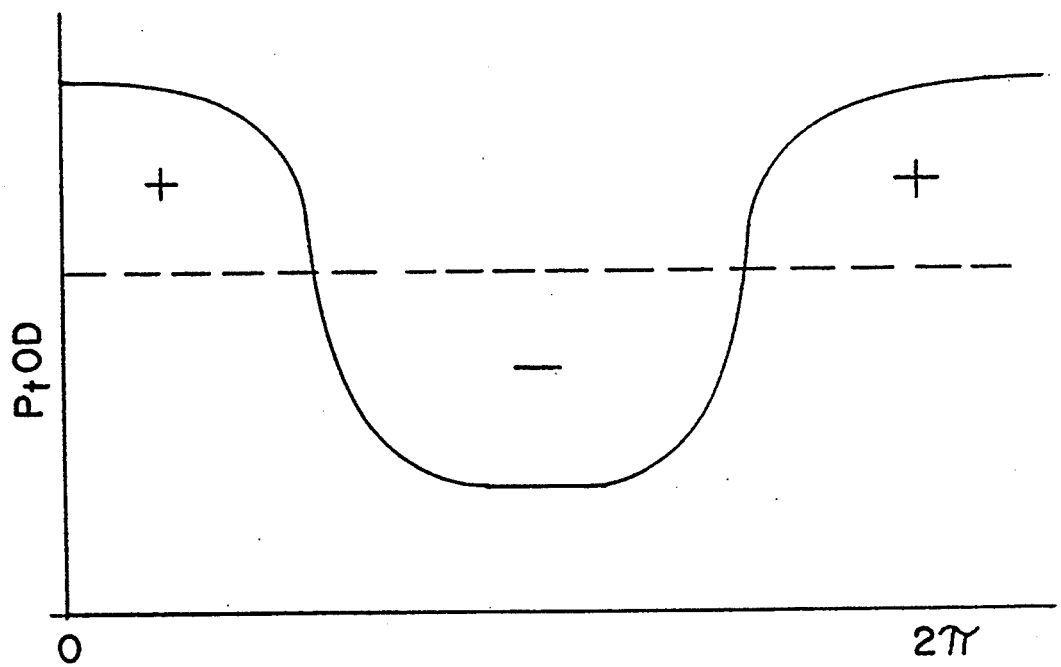
FIG. 5 is a graph showing total circumferential pressure distortion around an inlet with circumferential pressure distortion.

Before considering the way that the control uses the signals (of static pressure) from the sensors 16 and 18 with the aid of the signal flow charts in FIGS. 2 and 3, attention should be directed to the graphs in FIGS. 4 and 5. Graph 4 shows that as the radius (from a sensor 18) increases it can be assumed that the pressure distortion will increase linearly. Thus, starting with a pressure measurement at a sensor 18, a radially map of pressure along an imaginary radial map line 18.1 would follow the pattern of FIG. 4. On the other hand, FIG. 5 provides a different plot: of pressure around the inlet circumference, that is, along the imaginary line 16.1 along which the sensors 16 are placed. This map shows pressures that are above and below average demonstrating a distorted pressure pattern. The magnitude of circumferential pressure distortion is manifested in the map in FIG. 5 and may be computed from the total area of the map.

Applying this to FIG. 2, which is an exemplary signal processing scheme for carrying out the invention, the process begins with step S1, when the pressure signals (PC and PR) are read from the sensors. At step S2, the total pressure for each sensor is calculated using the total pressure $P_t$ computation subroutine shown as steps S20–S26 in FIG. 3, which uses standard engine nomenclature to explain how to produce, at step S26, the value $P_t$ from each static pressure signal. There "PS" means either PC or PR.

At step S3 in FIG. 2, the radial and circumferential pressure distortions are calculated in this way starting with the value of $P_t$ for each sensor. All the values of $P_t$ are averaged to produce $P_{tavg}$. Then, the average of $P_t$ for all the OD sensors 16 is calculated ($P_{todavg}$) and, likewise, the average ($P_{tidavg}$) for all the sensors 18 is calculated. Radial pressure distortion is calculated by:

Equation 3

Radial distortion $= P_{todavg} - P_{tidavg}/P_{tavg}$

Circumferential distortion, however, is calculated somewhat differently. The first step is to calculate the difference between the total pressure at each sensor 18 and the $P_{todavg}$. Then, that difference is divided by $P_{todavg}$ producing a ratio with a magnitude indicative of the total pressure variation from the average for each sensor 16.

Thus, eight values of data points will be produced if eight sensors are used, as shown in FIG. 1. As will be explained below with reference to step S6, these data points are correlated to experimentally obtained data points for the inlet to determine the stall margin loss. The radial distortion value is likewise correlated.

However, before moving to step S6, the routine tests the peak to peak (P—P) variations in static pressure of one or more of the sensors to produce a signal XP. In step S5, a stall precursor flag (Flag 1) is set if the value of XP exceeds a reference value, indicating that a stall is imminent. A test is made at step S5.1 for Flag 1 and an affirmative answer moves the routine immediately to step S9, which initiates a stall prevention/recovery pattern, e.g. immediately opening the exhaust nozzle on the engine or opening the stator vanes.

Assuming a negative answer at step S5.1, the routine progresses to step S6. There, radial and circumferential pressure distortion data for the inlet are referenced, e.g from a look-up table in the MEM, to determine the stall margin loss for the inlet. Engine model data is read at step S7, a step that correlates the stall margin loss to the compressor characteristics and N2, causing, in step S8, the production of a control pattern for the engine, which is executed in step S10. That control pattern may involve, depending upon the engine characteristics, varying bleed, stator deflection or exhaust nozzle area.

The routine in FIG. 2 can, of course, be entered and run many times per second depending upon the main program. Ideally, pressure sampling in step S1 should be done at a rate that bandwidth limits pressure changes to avoid unnecessary aberrations, for instance at 1000 Hz, which would have a frequency response of 200 Hz, sufficient for the data that is monitored.

While pressure has been used, temperature may also be plotted and its distortion across the inlet also mapped and compared to generate a stall precursor signal that causes geometry augmentation if the error satisfies the distortion error for the particular engine. In this regard, it should be considered that the sensors in the inlet are "engine neutral": the data that they produce is compared to data for the engine and data computed based on engine operation to diagnose the distortion pattern's severity for the engine and to command a geometry change if required for the engine. One type of sensor that may be used, because of its high response, light weight and EMI immunity, is the model P 104 by MetriCor.

Aided by the foregoing discussion, one skilled in the art may be able to make modifications and variations to the invention, in whole or in part, without departing from the true scope and spirit of the invention.

We claim:

1. A gas turbine engine comprising a control for modifying engine airflow geometry as a function of engine operating conditions comprising signal processing means, characterized by:

means on a main air inlet to the compressor for providing a plurality of static pressure signals at a plurality inlet locations along inner and outer diameters of the inlet; and the signal processing means comprising means for converting each static pressure signal to a total pressure signal, for computing, from each total pressure signal, pressure variation values for radial and circumferential directions across the inlet between the-inner and outer diameters, for producing a signal manifesting the pressure distortion level for the inlet by correlating said pressure variation values with stored values of pressure distortion for the inlet that are stored in the signal processor, and for providing a control signal to change engine airflow geometry as a function of a stall margin loss signal produced by correlating the signal manifesting pressure distortion to the engine using values for stall margin loss for the engine that are stored in the signal processor.

2. The invention described in claim 1, further characterized in that:

the signal processing means comprises means for providing a stall precursor signal in response time varying changes in at least one of the static pressure signals and for providing a stall control signal to modify engine airflow geometry in response to the stall precursor signal to increase compressor stall margin.

3. The invention described in claim 2, further characterized in that the time varying changes are peak to peak changes in static pressure.

4. The invention described in claim 1, further characterized in that:

the signal processing means comprises means for providing an AV signal manifesting the average of total pressure for the pressure sensors, for providing an OD signal manifesting the average of total pressure for each sensor along the inlet outer diameter, for providing an ID signal manifesting the average total pressure of each sensor along the inlet inner diameter, and for providing a radial pressure distortion signal with a magnitude proportional to the difference between the OD and ID signals divided by the AV signal.

5. The invention described in claim 4, further characterized in that:

the signal processing means comprises means for providing a circumferential pressure distortion signal manifesting the difference between the AV signal and the total pressure computed for each outer diameter sensor divided by the AV signal.

6. The invention described in claim 5, further characterized in that:

the signal processing means comprises means for providing a stall precursor signal in response to time varying changes in at least one of the static pressure signals and for providing a stall control signal to modify engine airflow geometry in response to the stall precursor signal to increase compressor stall margin.

7. The invention described in claim 6, further characterized in that the time varying changes are peak to peak changes.

* * * * *